United States Patent [19]
Charron

[11] 3,969,840
[45] July 20, 1976

[54] FISHING LURE

[76] Inventor: John R. E. Charron, 106 Horace St., Winnipeg, Manitoba, Canada, R2H OV9

[22] Filed: Jan. 20, 1975

[21] Appl. No.: 542,231

[30] Foreign Application Priority Data
Jan. 17, 1974  Canada ................. 190616

[52] U.S. Cl. ................. 43/42.06; 43/42.28; 43/42.37
[51] Int. Cl.² ................. A01K 85/00
[58] Field of Search ............ 43/42.06, 42.28, 42.37

[56] References Cited
UNITED STATES PATENTS

| 231,912 | 9/1880 | Irgens | 43/42.37 X |
|---|---|---|---|
| 326,886 | 9/1885 | Robinson | 43/42.37 X |
| 2,045,703 | 6/1936 | Dubois | 43/42.28 X |
| 2,543,464 | 2/1951 | McPherson | 43/42.06 |
| 2,599,128 | 6/1952 | Roberts | 43/42.06 X |
| 2,674,058 | 4/1954 | Lindenberg | 43/42.06 |
| 2,968,886 | 1/1961 | Cotroumpas | 43/42.06 |

*Primary Examiner*—Hugh R. Chamblee
*Assistant Examiner*—Daniel J. Leach
*Attorney, Agent, or Firm*—Stanley G. Ade

[57] ABSTRACT

A plastic tube has a detachable plug acting as a closure to the tube. The plug is hollow and has a needle on the inner end to pierce the tube wall if desired so that soluble bait in the tube gradually dissolves as the lure is used. The hollow plug affects the action of the lure in the water and also can be used to receive soluble bait. The tube can be decorated and supplied with a hook and/or spinner, can be attached to a conventional lure or can be dressed to simulate a fly and used as a dry or wet fly. If the walls of the tube are not pierced, the tube acts as a flotation means for a lure and whether pierced or not, lead shot or the like can be inserted in the tube to control the depth characteristics of the lure.

4 Claims, 14 Drawing Figures

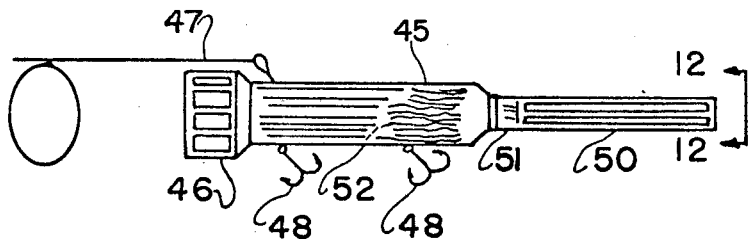
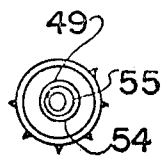
FIG. 11  FIG. 12
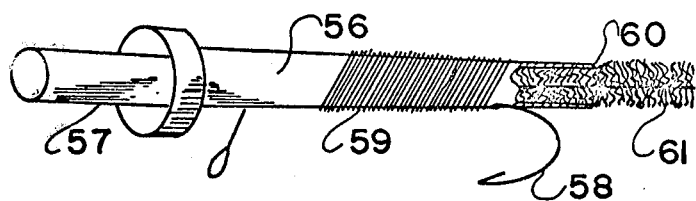
FIG. 13
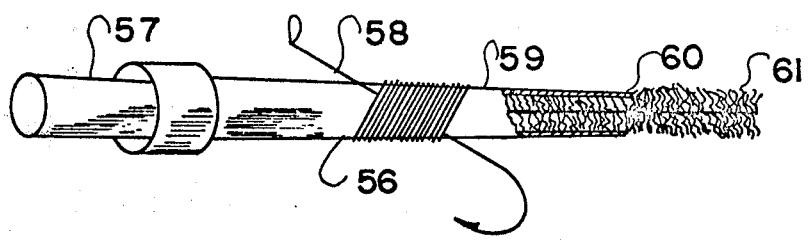
FIG. 14

FISHING LURE

BACKGROUND OF THE INVENTION

This invention relates to new and useful improvements in fishing lures, particularly fishing lures adapted to receive a soluble bait which gradually dissolves as the lure is used thus attracting game fish to the lure.

Conventionally, bait is impaled upon a hook of a lure or, alternatively, the lure is hollow so that soluble bait can be used therein.

Such lures are restricted in use and convenience inasmuch as each lure must be constructed independently if it is desired to use same with a soluble bait.

SUMMARY OF THE INVENTION

The present invention overcomes these disadvantages inasmuch as it comprises a small plastic tube closed at one end and having a detachable plug in the other end. A needle or the like on the inner end of the plug may be used to pierce holes in the wall of the tube so that soluble bait which may be contained in the tube can dissolve while the lure is being used.

The tube can either be decorated to simulate a fly, or the like or, alternatively, can be secured to a spoon or the like.

Alternatively, a hook element can be inserted through the end or wall of the lure and can be used with a spinner, with or without decoration or camouflage.

The principal object and essence of the invention is therefore to provide a device of the character herewithin described which may be adapted to be used as a container for a soluble bait or as a container for weight controlling means such as lead shot or the like.

Another object of the invention is to provide a device of the character herewithin described which can be incorporated with a conventional lure, or alternatively, can be dressed or camouflaged to simulate a jig or fly or the like.

Another object of the invention is to provide a device of the character herewithin described which is adaptable for use in many forms of lures such as wet or dry flies, streamer flies, trolling lures or jigs.

Yet another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DETAILED DESCRIPTION OF THE DRAWINGS

FIG. 11 is a side elevation of a further embodiment.

FIG. 12 is a view along the line 12—12 of FIG. 11 with the hooks removed.

FIGS. 13 and 14 are side elevations of a further embodiment of the invention.

In the drawings like characters of reference indicate corresponding parts in the different figures.

Figure 1:
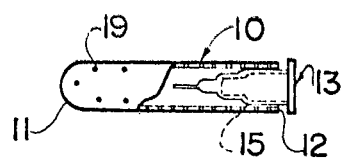
FIG. 1 is a side elevation partially fragmented, of the basic tube and plug portion of the lure.
Figure 2:
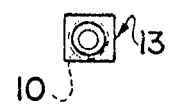
FIG. 2 is an end view of FIG. 1.

DETAILED DESCRIPTION proceeding therefore to describe the invention in detail, the lure consists basically of a relatively elongated cylindrical plastic tube 10 having a closed end 11 and an open end 12.

Closure means taking the form of a plug 13 is detachably engaged within the open end 12 and this plug includes an outer portion 14, an intermediate tube engaging portion 15 and an inner portion 16.

The intermediate portion 15 is provided with longitudinally extending ribs 17 which assist in the frictional engagement of the plug within the end 12 of the tube 10.

Figure 10:
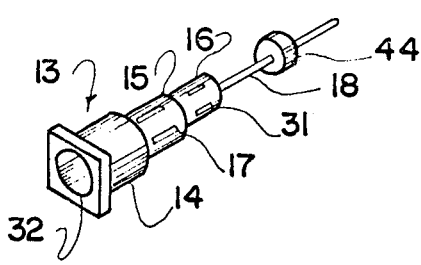
FIG. 10 is an enlarged isometric view of the closure plug per se showing one embodiment thereof.

A piercing device such as a needle 18 is secured to the inner portion 16 and extends therefrom as clearly shown in FIGS. 1 and 10 and this piercing device may be used to pierce small apertures 19 through the wall of the tube 10 if so desired. If such apertures are not pierced, then the tube acts as a flotation medium particularly if it is attached to a hook element.

Figure 3:
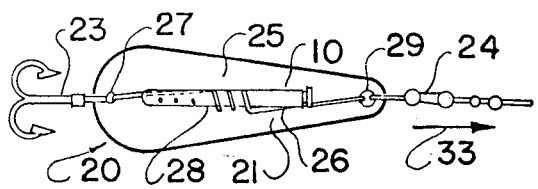
FIG. 3 is a side elevation of a spoon with the device of FIG. 1 secured thereto.
Figure 4:
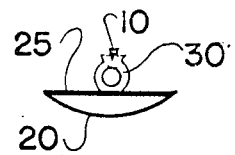
FIG. 4 is an end view of FIG. 3 but showing an alternative method of securing the tube to the spoon.

FIGS. 3 and 4 show such attachment of a hook element collectively designated 20 which, in this embodiment, takes the form of a spoon 21 having a hook 23 secured thereto and a leader attachment 24 secured to the other end. The tube 10 engages the concave side 25 of the spoon and is held in position by means of a length of wire 26 which hooks through the hook aperture 27 at one end, spirals around the body of the tube as indicated by reference character 28 and then hooks within the aperture 29 to which the leader attachment 24 is secured thus holding the tube snugly against the concave surface of the spoon. Alternatively, spring clips 30 may be secured to the concave section of spoon 20 so that the tube 10 can be snapped into engagement with the spring clips as shown in FIG. 4.

If the device is to be used with soluble bait or the like, then one or more apertures 19 are pierced through the wall of the tube so that the bait may dissolve during use and gradually be disseminated from the lure in order to attract game fish.

Of importance is the fact that the aforementioned plug 13 is closed at the inner end 31 thereof and is hollow with the open end 32 being within the outer portion 14 so that this open end is facing the direction of travel either by retrieving or trolling and indicated by reference character 33. This means that the open end affects the action of the lure considerably and alternatively, can be used to receive soluble bait if the device is to be used as a flotation element rather than a bait container. The flotation characteristics can also be controlled by the provision of small weights such as lead shot (not illustrated) which may be used with the tube 10 whether it is being used with or without a soluble bait.

Figure 5:
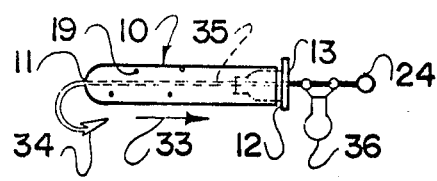
FIG. 5 is a side elevation of one embodiment of the invention.
Figure 6:
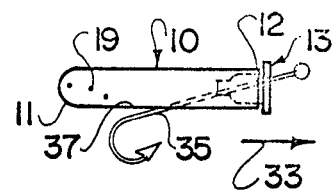
FIG. 6 is a side elevation of another embodiment of the invention.
Figure 7:
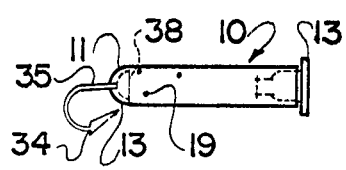
FIG. 7 is a side elevation of a still further embodiment of the invention.

FIGS. 5, 6 and 7 show an alternative embodiment in which a hook component 34 includes a shank 35 which engages through the closed end 11 of the tube and through the plug 13. Sufficient length of shank is provided to enable the plug to be withdrawn and replaced within the tube 10 and, if desired, a small spinner assembly 36 may be secured upon the shank exteriorally of the tube 10.

Alternatively, the shank 35 may engage through the side wall 37 of the tube and then through the plug 13 as clearly shown.

FIG. 7 shows the hook component 34 with the small shank portion 35 engaged through the end 11 of the tube and being anchored within the end as indicated by reference character 38.

Figure 8:
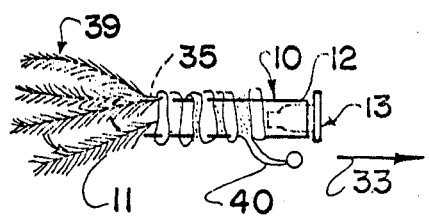
FIG. 8 is a side elevation of a further embodiment of the invention.

FIG. 8 shows the tube 10 with the hook component 35 secured to the outside of the tube as by whipping (not illustrated) so that the hook extends beyond the closed end 11. In this particular embodiment, the entire tube and hook element are covered with decorative material such as brightly colored feathers, wool or the like indicated generally by reference character 39 thus camouflaging the tube and hook. In this connection, a leader attaching lug 40 is also secured to the tube 10 by means of whipping (not illustrated).

Figure 9:
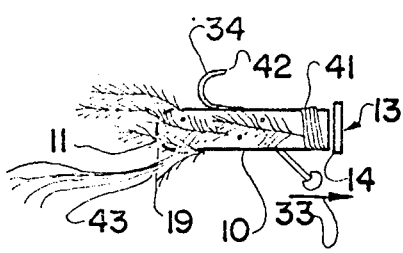
FIG. 9 is a side elevation of a yet further embodiment of the invention.

FIG. 9 shows what might be termed the preferred embodiment inasmuch as the hook 34 is secured to the outside of the tube 10 by means of whipping 41 and lies with the barbed portion 42 curving upwardly from the side wall of the tube 10.

Brightly colored feathers and the like, generally indicated by reference character 43 are secured around the tube and extend rearwardly towards the closed end in a fan shape thus simulating a jig or fly so that the entire tube and hook is camouflaged. Some times it may be necessary to clean out the interior of the tube if it has been used with a soluble bait, and in this connection a relatively long needle shank 18 is provided with a small swab 44 on the distal end thereof made of sponge rubber or the like and which can be used to clean out the interior of the tube.

From the foregoing it will be seen that the lure which consists of the tube 10 and the closure 13 can be incorporated with a lure body and hook as shown in FIG. 3, or a hook alone as shown in the remainder of the embodiments, said tube and hook being camouflaged or not by decorative features such as feathers, hair and the like.

Furthermore the tube can be pierced to allow soluble bait to be used, or alternatively, can be used as a flotation means, the flotation being controlled by the addition of lead shot if necesssary.

The plug 13 is provided with a piercing device and also is hollow so that the hollow open end affects the characteristics of the lure during use and also can be used to receive soluble bait if desired.

Finally reference should be made to FIGS. 11 and 12 which show the preferred embodiment. In this embodiment, a plastic tube 45 is provided with a detachable cap 46 at one end thereof. A leader assembly 47 may be attached to the upper side of the tube and treble hooks 48 may be secured to the underside of the tube in the conventional manner.

The rear end of the tube is open as indicated by reference character 49 and a plunger assembly 50 engages the tube through the rear end thereof. This plunger is provided with a cylindrical shouldered portion 51 having a brush or the like 52 secured to the inner end thereof and when in the position shown in FIG. 11, this cylindrical shoulder 51 closes the rear end 49 of the tube and it should be noted that this rear end is reduced in diameter with respect to the remainder of the tube.

The extending portion of the assembly 50 is reduced in diameter with respect to the cylindrical portion 51 and is provided with a plurality of longitudinally extending ribs 54 as clearly shown. The brush 52 is used to clean the tube as hereinbefore described and when in the position shown in FIG. 11, the tube is sealed. Any lure material held within the tube can therefore not escape but if it is desired to use such lure material, either liquid or granular, then the assembly 50 is pushed inwardly so that the cylindrical portion 51 clears the end 49 so that lure material can be expelled through the rear end and between adjacent ribs 54 through the spaces 55 shown in FIG. 12. This eliminates the necessity of piercing the tube, it being understood that the tube can be charged through the detachable cap 46.

The lure can be made to simulate a butterfly or other insect, or fish, frog or the like. The object is to make an artifical lure as close as possible to live bait. Therefore the body of the lure, although hollow, can be manufactured from material corresponding to live bait insofar as feel, looks, texture, colour, motion, taste, sound and smell and the like. The body can be made of a rigid material or a soft flexible material.

One of the purposes of the lure is to carry bait material that could not normally be carried on a hook such as soluble or mushy material; for instance, cheese, sausage, crushed insects or firm but untextured baits such as liver and the like which will not stay on a hook for any appreciable amount of time.

When the lure is designed for use as a surface bait or dry fly, there is no need to spray the decorative materials such as hair or feathers whether real or artificial in order to ensure that the lure floats. Because the lure is hollow, it is only necessary to plug both ends so that the lure acts as a float, or carrier for the decorative materials. By contrast conventional artificial flies or the like are sprayed with a solution to extend the surface flotation time.

Soluble and non soluble baits used with this lure mask the human scent associated with the handling of baits and lures by the fisherman and it is believed that human scent tends to spook certain species of fish. The shaped nose on some of the embodiments causes sound when the lure is pulled through the water particularly when the lure is empty.

FIGS. 13 and 14 show the preferred model comprising a hollow tube 56 having a detachable nose portion 57 and a hook 58 which may be attached by binding 59 and/or adhesive (not illustrated). The distal end 60 is open but reduced in diameter and a brush 61 is engaged within this end. The brush is preferably a type of pipe cleaner or the like and can be removed and inserted in the other end of the tube for cleaning purposes.

A small aperture (not illustrated) is formed through the nose portion 57 to allow the intake of water so that soluble material carried in the tube may dissolve and seep out through and around the brush 61.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A fishing lure comprising in combination a hollow tube, closed at the trailing end, detachable closure means at the leading end and a hook element secured to said tube, said closure means including a hollow plug inserted by the inner end thereof into said leading end and being frictionally held therein with the outer end outside of said tube, said hollow plug being closed at the inner end and opened at the outer end thereof whereby the action of said lure moving through the water is influenced, and a tube piercing device secured to and extending from the inner end of said plug.

2. The lure according to claim 1 in which said hook element includes a lure body and means to secure said tube to said body.

3. The lure according to claim 1 in which said hook element is secured to the wall of said tube and decorative means attached around said wall to camouflage said hook element and said tube.

4. The lure according to claim 1 in which said hook element includes a shank, said shank engaging through said closed end of said tube and through said closure means.

* * * * *